(12) United States Patent
Flora et al.

(10) Patent No.: US 8,191,346 B2
(45) Date of Patent: Jun. 5, 2012

(54) MOBILE MACHINERY HAVING A DUST SUPPRESSION SYSTEM

(75) Inventors: Jonathan J. Flora, Modesto, CA (US);
Douglas W. Flora, Modesto, CA (US);
Adam Benedict, Modesto, CA (US)

(73) Assignee: Exact Corp., Modesto, CA (US)

( * ) Notice: Subject to any disclaimer, the term of this patent is extended or adjusted under 35 U.S.C. 154(b) by 0 days.

(21) Appl. No.: 13/243,588

(22) Filed: Sep. 23, 2011

(65) Prior Publication Data

US 2012/0017560 A1 Jan. 26, 2012

Related U.S. Application Data

(62) Division of application No. 12/625,481, filed on Dec. 29, 2009, now Pat. No. 8,056,313.

(51) Int. Cl.
*A01D 51/00* (2006.01)
*A01F 12/54* (2006.01)

(52) U.S. Cl. ...................... 56/328.1; 15/340.1

(58) Field of Classification Search ............ 171/17, 171/41, 26; 209/311, 22, 233, 139.1, 147, 209/644, 638, 642; 15/340.1, 347; 56/340.1, 56/12.8, 13.1, 16.5, 328.1, 327.1; 55/385.1
See application file for complete search history.

(56) References Cited

U.S. PATENT DOCUMENTS

| | | | |
|---|---|---|---|
| 2,587,289 A * | 2/1952 | Cook ............................ 460/59 |
| 3,227,276 A * | 1/1966 | Leighton et al. ............ 209/139.1 |
| 3,626,677 A * | 12/1971 | Sides ........................... 56/328.1 |
| 3,698,171 A * | 10/1972 | Hecht ............................ 56/331 |
| 3,854,585 A * | 12/1974 | Herkes .......................... 209/3.1 |
| 4,068,802 A | 1/1978 | Goings |
| 4,194,346 A * | 3/1980 | Ingalls ......................... 56/328.1 |
| 4,289,509 A | 9/1981 | Holter |
| 4,290,820 A * | 9/1981 | Swisher et al. ................... 134/6 |
| 4,364,222 A | 12/1982 | Ramacher |
| 4,371,477 A | 2/1983 | Karowiec et al. |
| 4,572,741 A * | 2/1986 | Mason ............................ 127/2 |
| 4,642,977 A * | 2/1987 | Ramacher .................... 56/328.1 |
| 4,753,296 A * | 6/1988 | Kruithoff ........................ 171/26 |
| 5,001,893 A * | 3/1991 | Stanley et al. ............... 56/328.1 |
| 5,024,278 A * | 6/1991 | Shuknecht ...................... 171/17 |
| 5,113,643 A * | 5/1992 | Peterson et al. ................. 56/153 |
| 5,178,654 A | 1/1993 | Cowley et al. |
| 5,219,208 A | 6/1993 | Liao et al. |

(Continued)

FOREIGN PATENT DOCUMENTS

WO WO 2006092702 A2 9/2006

*Primary Examiner* — Arpad Fabian-Kovacs
(74) *Attorney, Agent, or Firm* — James M. Duncan, Esq.; Klein, DeNatale, Goldner etc.

(57) ABSTRACT

A mobile harvesting unit which utilizes a high volume fan to separate crops from foreign matter, has a dust suppression system which substantially reduces particulates which are discharged with the fan exhaust. The dust suppression system has two stages. The first stage separates larger particles of foreign matter by deploying an air stream cleaning chain upstream of the fan. The second stage is contained within a air stream discharge duct. Within the air stream discharge duct, a liquid, such as water, is sprayed into the dust entrained air stream. The moistened air stream flows through a plurality of collection members which extend radially from a brush drum, where the moistened dust particles are accumulated on the collection members, such that the volume of dust particles contained within the air discharged from the harvesting unit is substantially reduced.

17 Claims, 21 Drawing Sheets

U.S. PATENT DOCUMENTS

| | | | |
|---|---|---|---|
| 5,253,925 A | 10/1993 | Modzik, Jr. | |
| 5,361,600 A | 11/1994 | Kelley | |
| 5,373,688 A * | 12/1994 | Stanley et al. | 56/328.1 |
| 5,376,046 A * | 12/1994 | Shuknecht et al. | 460/99 |
| 5,415,671 A | 5/1995 | Bouchard et al. | |
| 5,421,147 A * | 6/1995 | Holden et al. | 56/328.1 |
| 5,713,970 A | 2/1998 | Raring | |
| 5,743,043 A | 4/1998 | Habenicht et al. | |
| 5,803,955 A | 9/1998 | Raring | |
| 6,036,600 A | 3/2000 | Kruckman | |
| 6,478,859 B1 | 11/2002 | Ferlin et al. | |
| 6,979,261 B1 | 12/2005 | Day et al. | |
| 7,131,254 B2 * | 11/2006 | Flora et al. | 56/328.1 |
| 7,409,743 B2 | 8/2008 | Di Anna | |
| 7,412,817 B2 * | 8/2008 | Flora et al. | 56/328.1 |
| 7,500,342 B2 | 3/2009 | Merant et al. | |
| 2007/0125558 A1 | 6/2007 | Embry | |

* cited by examiner

MOBILE MACHINERY HAVING A DUST SUPPRESSION SYSTEM

CROSS-REFERENCE TO RELATED APPLICATIONS

This is a divisional application of U.S. patent application Ser. No. 12/625,481 filed on Dec. 29, 2009 to which application these inventors claim domestic priority.

BACKGROUND OF THE INVENTION

The present invention generally relates to agricultural equipment, and devices which are utilized with agricultural equipment for controlling dust and other particulates generated from operation of the equipment. In particular, a mobile harvester is disclosed which is used for harvesting crops, such as nuts and/or fruits, where the harvester utilizes high volume air generated by an on-board fan to separate crops from foreign matter. The disclosed harvester addresses problems presented by the deposition of particulate matter into the air through the air exhaust of the harvester. The disclosed harvester comprises means for reducing dust and other particulate matter generated by the operation of the machinery which, by the nature of its operation, would otherwise generate substantial quantities of dust and disperse it into the atmosphere. The general mechanisms employed by the disclosed harvester capture and immobilize dust particles before the particles are dispersed into the atmosphere by the fan exhaust emitted from the machinery.

Dust generation by agricultural and construction machinery is a known problem, particularly in arid areas. To name just a few problems caused by the dust generation, dust particles result in air pollution, water pollution, soil loss, human and animal health problems, and potentially hazardous reductions in visibility. In addition, the dust can adversely impact the health of various plants. In an effort to reduce dust production, some air pollution control districts impose various operating limitations on farm machinery or otherwise impose different dust control measures.

Dust generation from nut and fruit harvesting equipment can be particularly problematic. These devices typically utilize high volume fans to separate nuts and/or fruit from the debris which may be picked up by the harvesting equipment, including leaves, branches, dirt clods, soil, etc. (collectively, "foreign material"). However, a large portion of the foreign material is typically blown out through the fan discharge, resulting in the dispersion of a large volume of dust into the atmosphere. An example of such a harvester is disclosed in U.S. Pat. No. 4,364,222, which is incorporated herein by this reference. In these devices, a mixture of fruit or nuts (generally referred to as "crops") and foreign material is picked up and deposited on conveyors enclosed by a housing connected to a fan inducing a vigorous flow of air through the conveyors. Various baffles, walls and guide plates direct the air so as to enhance the separation of the desirable crops from the foreign material. However, a substantial volume of foreign material is typically discharged into the atmosphere with a minimum amount of processing, thus creating a large discharge of dust.

SUMMARY OF THE INVENTION

The system described herein utilizes a primary separation methodology comprising an "air stream cleaning chain" to remove the larger particles of foreign material from the air stream before these particles are passed through the fan, pulverized, and discharged into the atmosphere. The collected larger particles of foreign material are thereafter deposited on a separate conveyor for discharge through an air lock and collected or disposed of as solid material rather than being entrained in the air stream and discharged through the fan exhaust. Not only does this greatly reduce dust produced by the discharge but it also greatly reduces fan wear by preventing the foreign material from passing through the discharge fan. The system further utilizes a fine particle collection methodology which is applied to the air stream which has passed through the air stream cleaning chain, which air stream contains fine particulate matter.

Harvested crops, such as fruit or nuts, and associated foreign material are gathered together at the front end of the harvesting unit by gathering means and then picked off the ground using lifting means such as a pick up belt or conveyor. The crops and foreign matter are eventually transferred onto a primary cleaning chain. As crops and foreign matter are transferred from the primary cleaning chain to an elevator chain, air is pulled through the cleaning chain and the articles conveyed thereon by the high volume fan. The air stream generated by the fan is effective in for removing the foreign material from the crops. It is to be appreciated that through the various stages of the device, a fraction of the crops and foreign material may be dropped from the harvester. Thus, the utilization of the terms "crops" and "foreign matter" are not intended to mean that the volume of these materials remain constant as they are transported through the stages of the invention.

The air stream cleaning chain is the key component of the primary separation methodology. The air stream cleaning chain may comprise, but is not limited to, a chain of about 4 feet in width which allows air to pass through the chain but stops larger foreign material such as grass, leaves, dirt clods, etc. Other embodiments of this component could include but are not limited to various widths, lengths, and structure of material that would accomplish the purpose of stopping foreign material while allowing the air to pass through. This allows the air stream cleaning chain to remove much of the foreign material from the air stream and delivering the foreign material to the cross conveyor discharge belt to be discharged from the machine through the air lock rather than being discharged through the fan.

Following this primary separation, the air discharge from the fan, which may include fine dust particles, is directed through an air baffle or air stream discharge duct, through which the air stream is discharged from the unit. The air stream discharge duct comprises dust particle suppression means comprising liquid introduction means and particulate collection means.

Liquid is introduced into the dust-laden air stream through liquid introduction means, such as spray tips, jets, or other orifices. For example, spray tips comprising a variety in number and tip size may be used for this purpose. As another embodiment, the system may utilize multiple manifolds of spray tips to offer various options of liquid volume to be introduced into the dust infused air stream. As another embodiment, the liquid introduction means may comprise nozzles contained within the walls of the air stream discharge duct. The liquid introduction means causes a pressurized liquid, such as water, to be sprayed into the dust-laden air stream, essentially creating a curtain of mist for the air stream to pass through.

The dust particle suppression system further comprises a dust scrubber, such as a wafer brush drum, through which the air stream passes after having passed through the spray of the liquid introduction means. The wafer brush drum consists of multiple wafer brushes mounted on a brush attachment sleeve. The wafer brush drum is typically rotated in a concurrent direction with the discharged air flow so as not to cause undue back pressure on the air system. The moistened air stream flows through the rotating wafer brush drum, which radially extending members collect small pieces of moist dirt from the air stream. The accumulated dust particles are discharged from the wafer brush drum as solids, thus allowing generally clean air to be discharged from the harvesting unit.

The disclosed dust suppression system may be adapted for use in any application which presents a high velocity air discharge to minimize the dust pollution from the discharge.

DETAILED DESCRIPTION OF THE EMBODIMENTS

Figure 1:
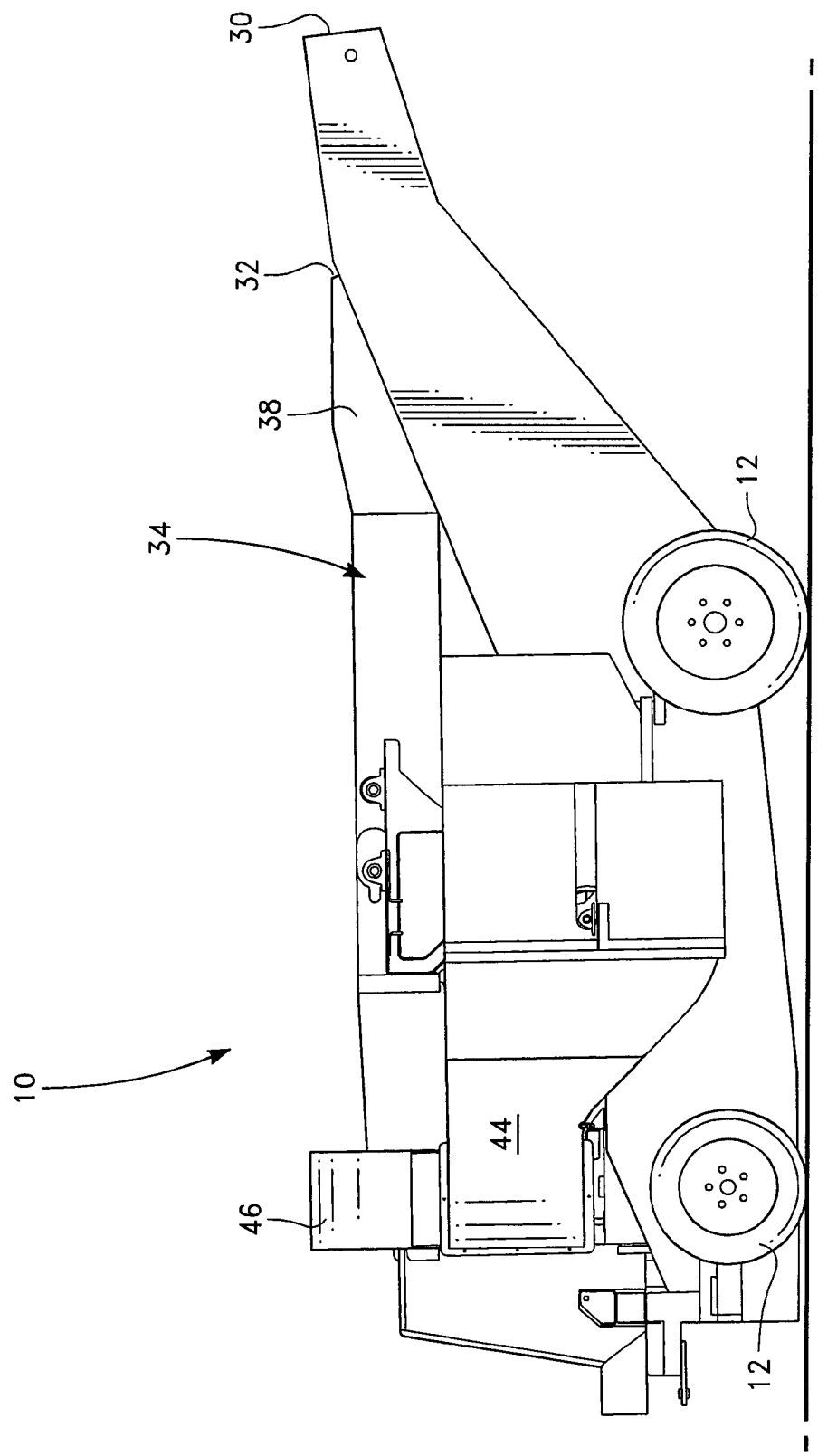
FIG. 1 is a left hand view of a harvester comprising an embodiment of the disclosed dust suppression system.
Figure 2:
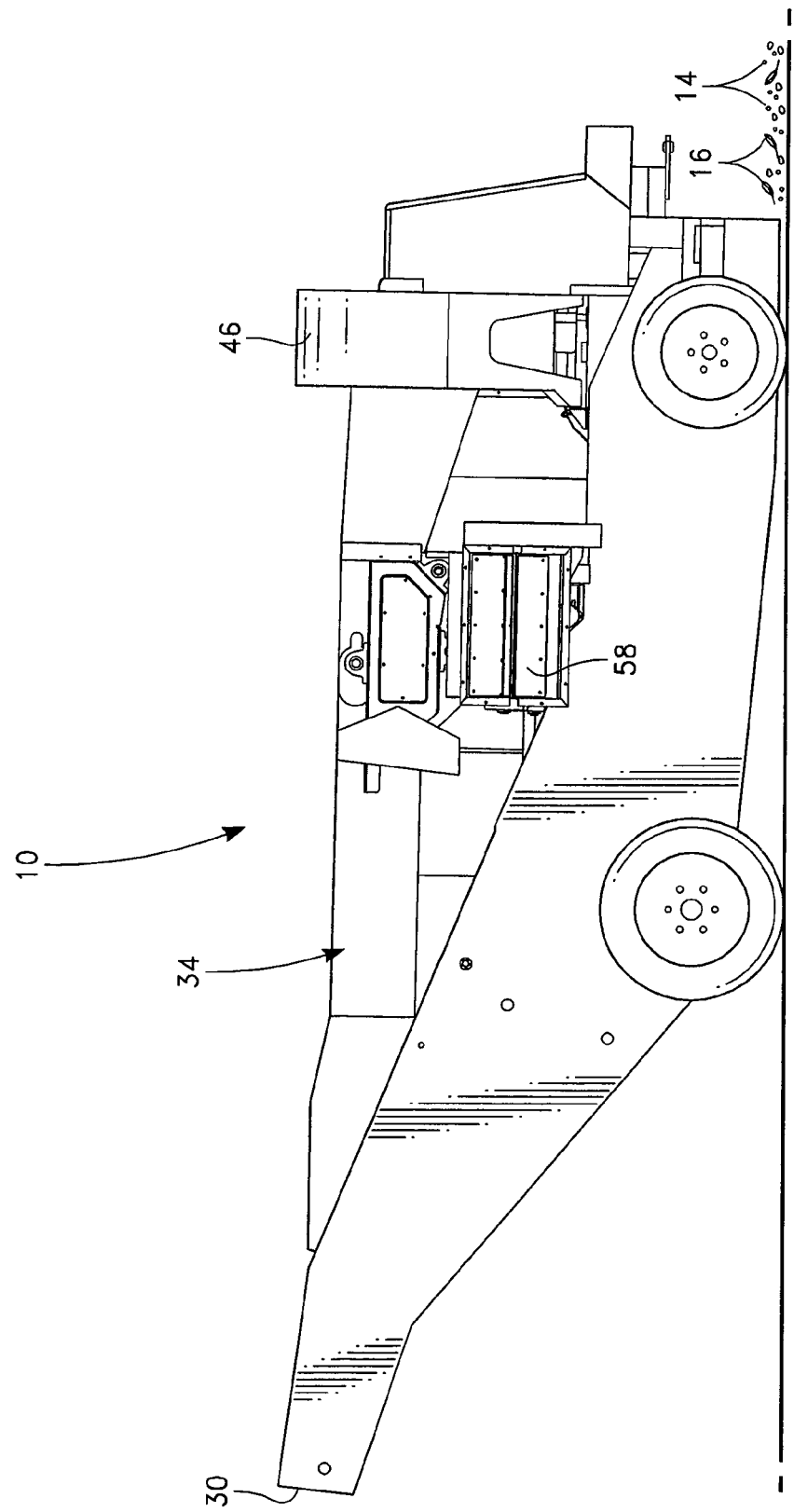
FIG. 2 is a right hand view of a harvester comprising an embodiment of the disclosed dust suppression system.
Figure 3:
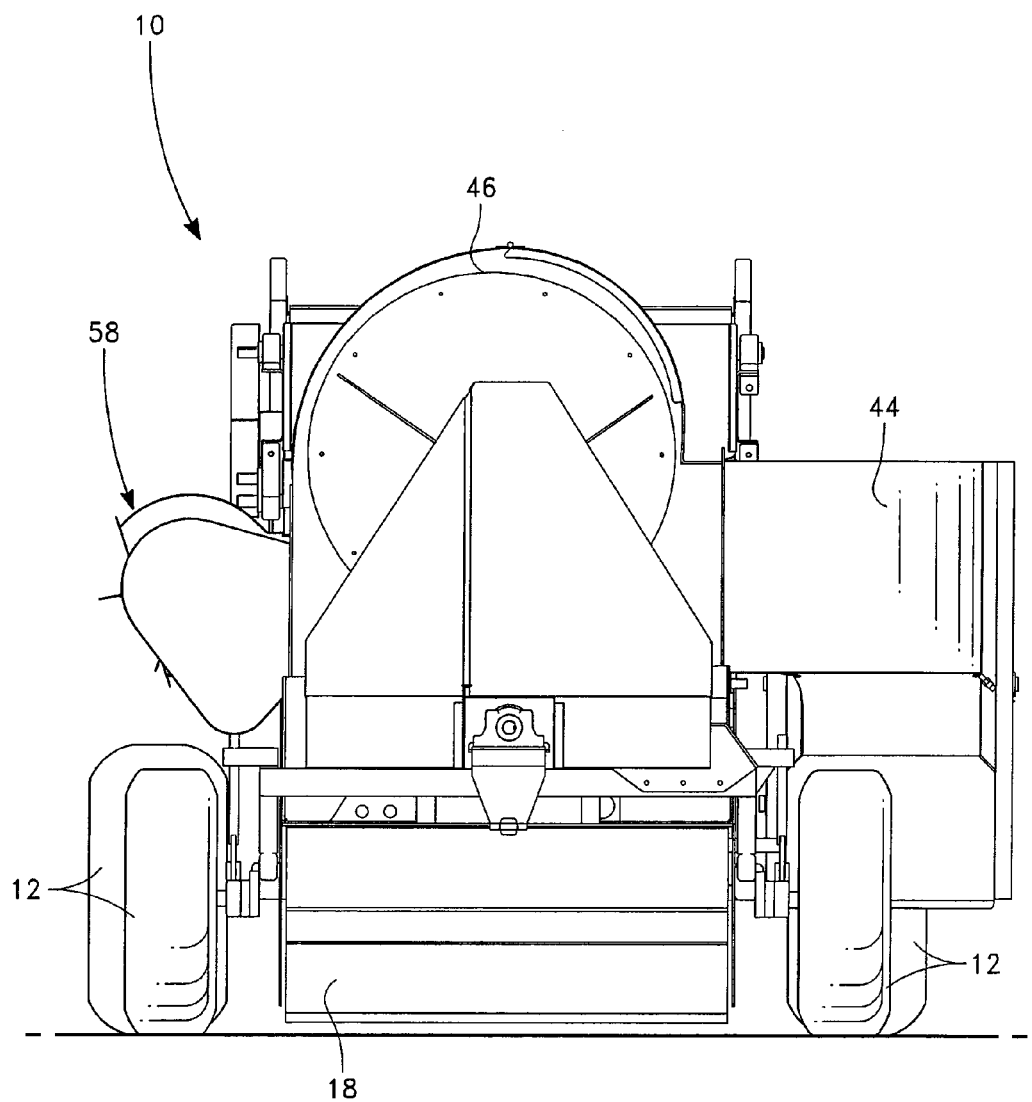
FIG. 3 is a front view of a harvester comprising an embodiment of the disclosed dust suppression system.
Figure 4:
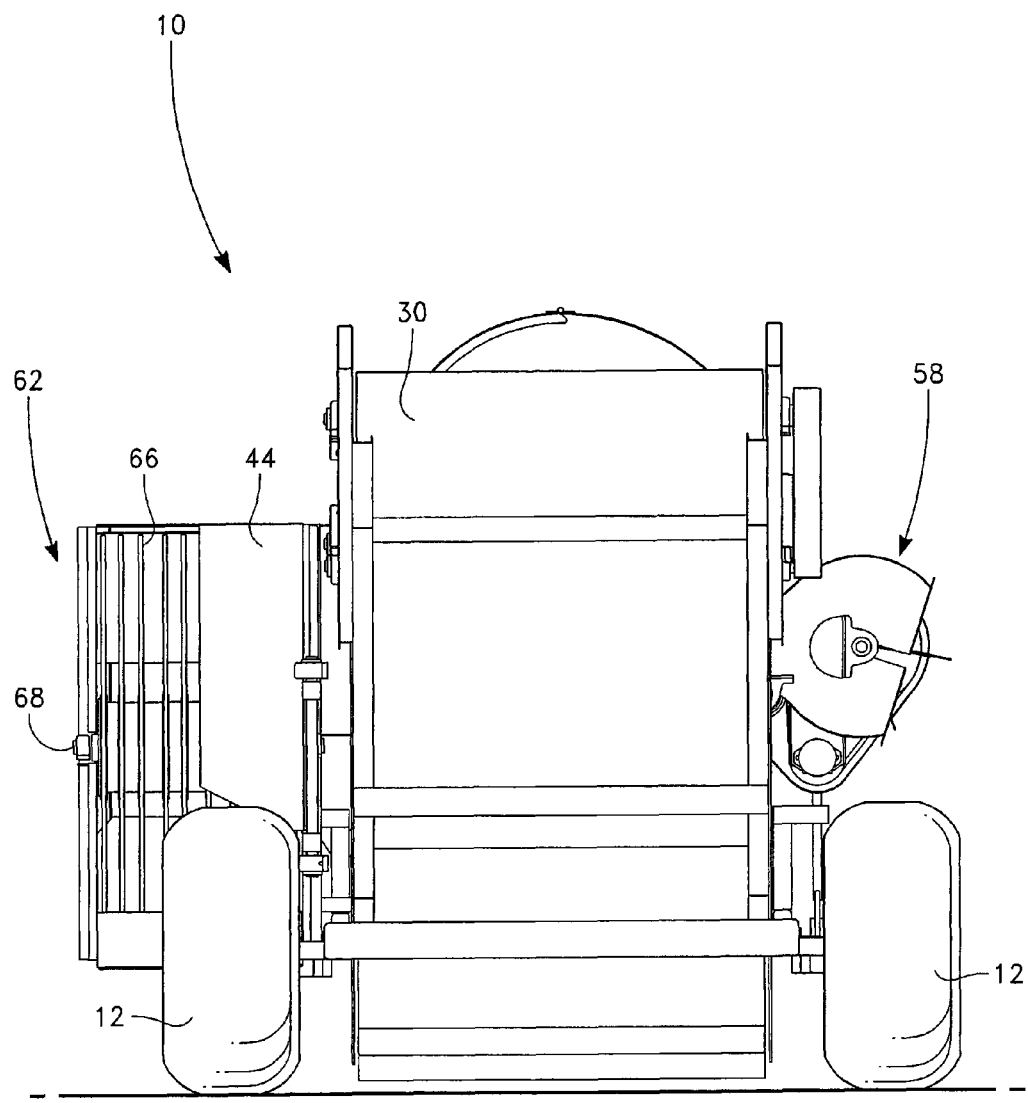
FIG. 4 is a rear view of a harvester comprising an embodiment of the disclosed dust suppression system.
Figure 5:
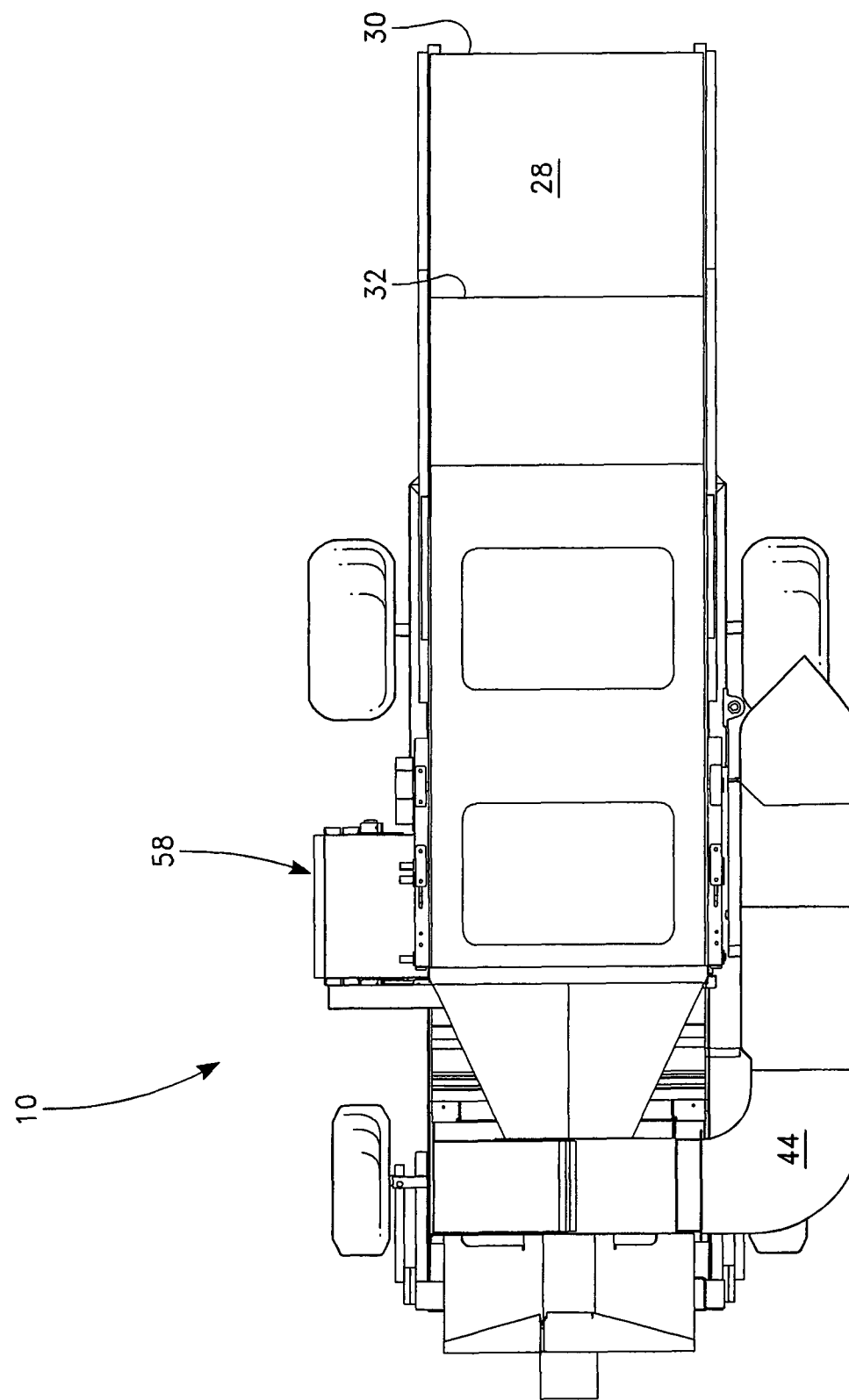
FIG. 5 is a top view of a harvester comprising an embodiment of the disclosed dust suppression system.
Figure 6:
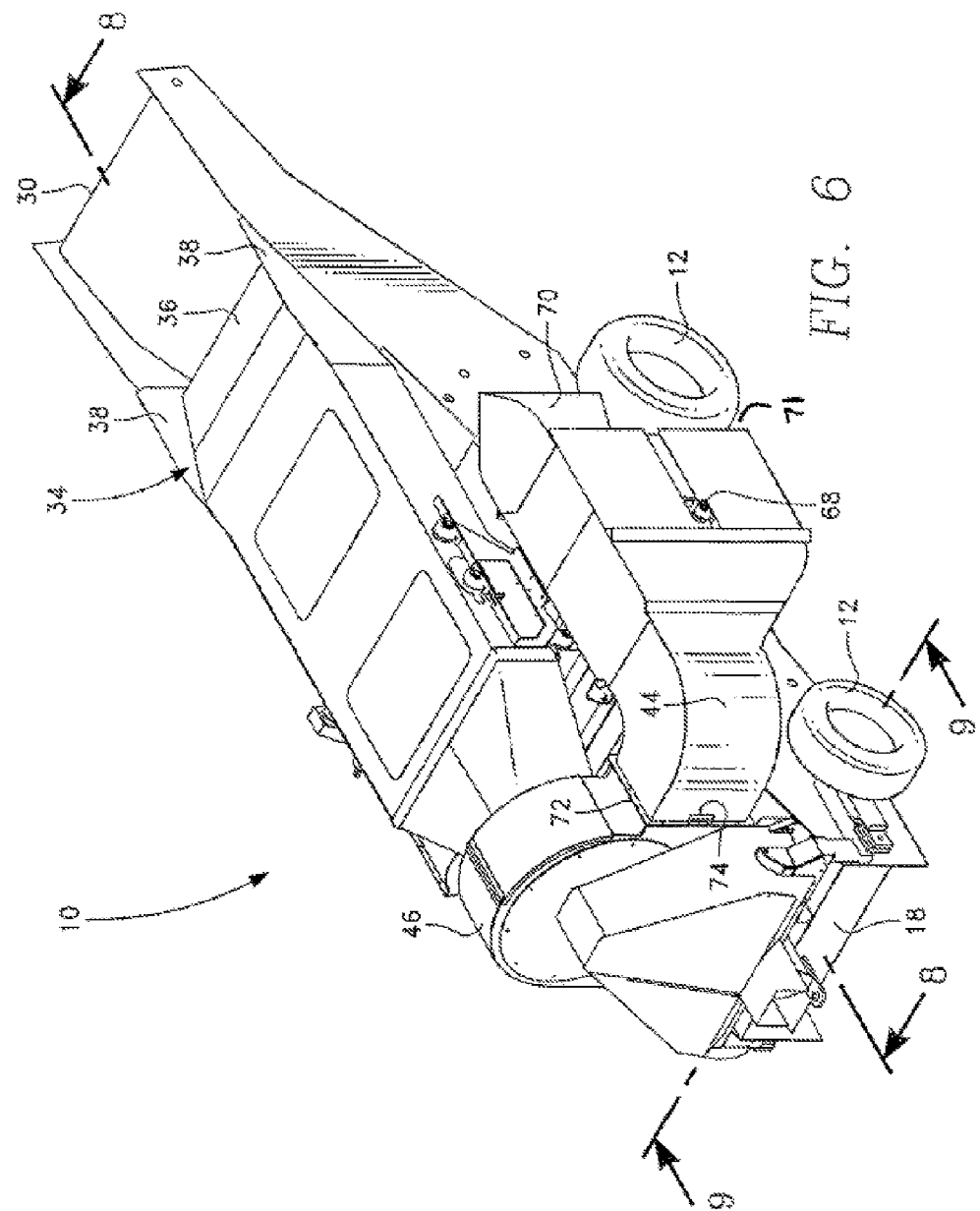
FIG. 6 is an isometric view of the left hand side of a harvester comprising an embodiment of the disclosed dust suppression system.
Figure 7:
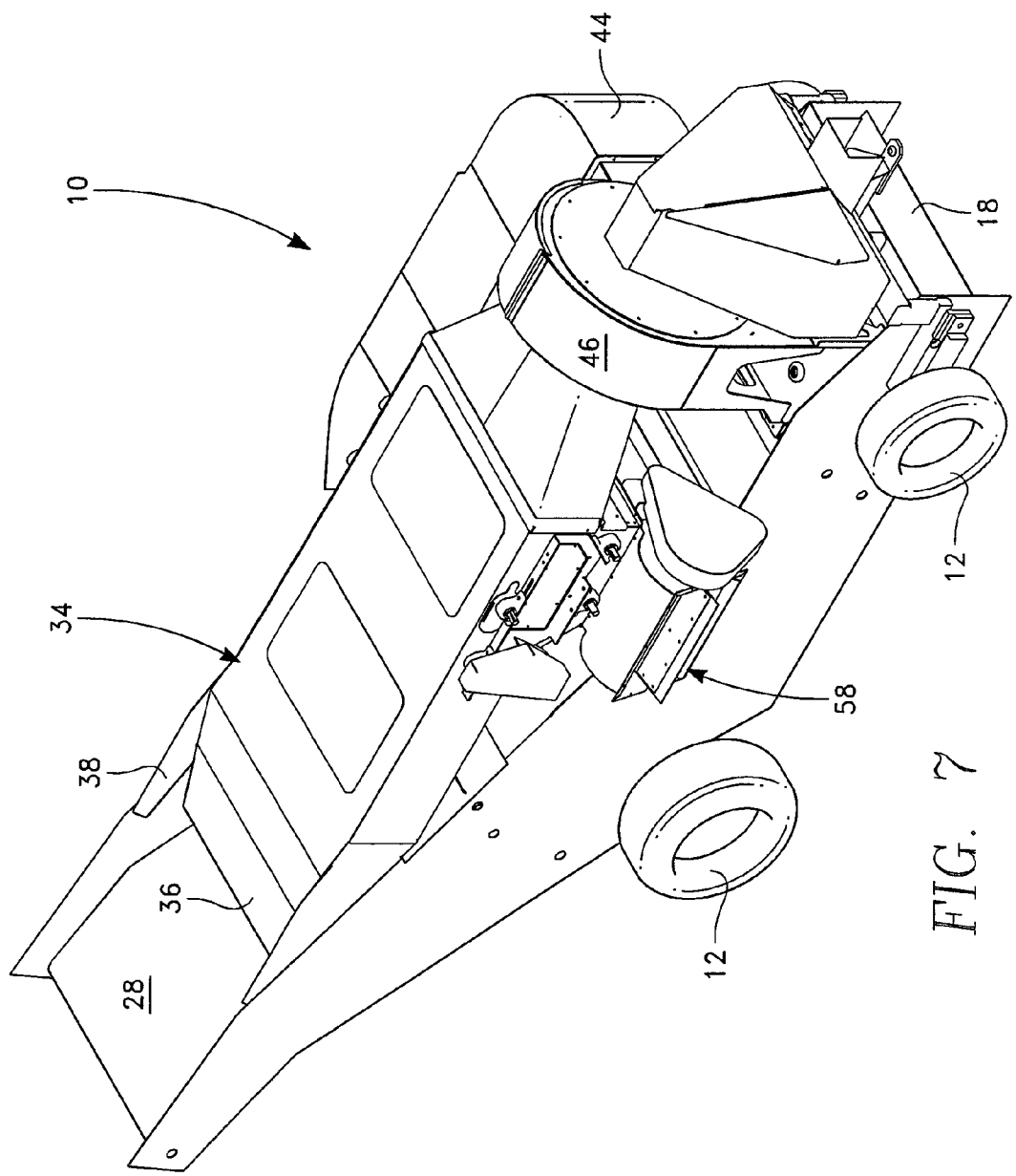
FIG. 7 is an isometric view of the right hand side of a harvester comprising an embodiment of the disclosed dust suppression system.
Figure 8:
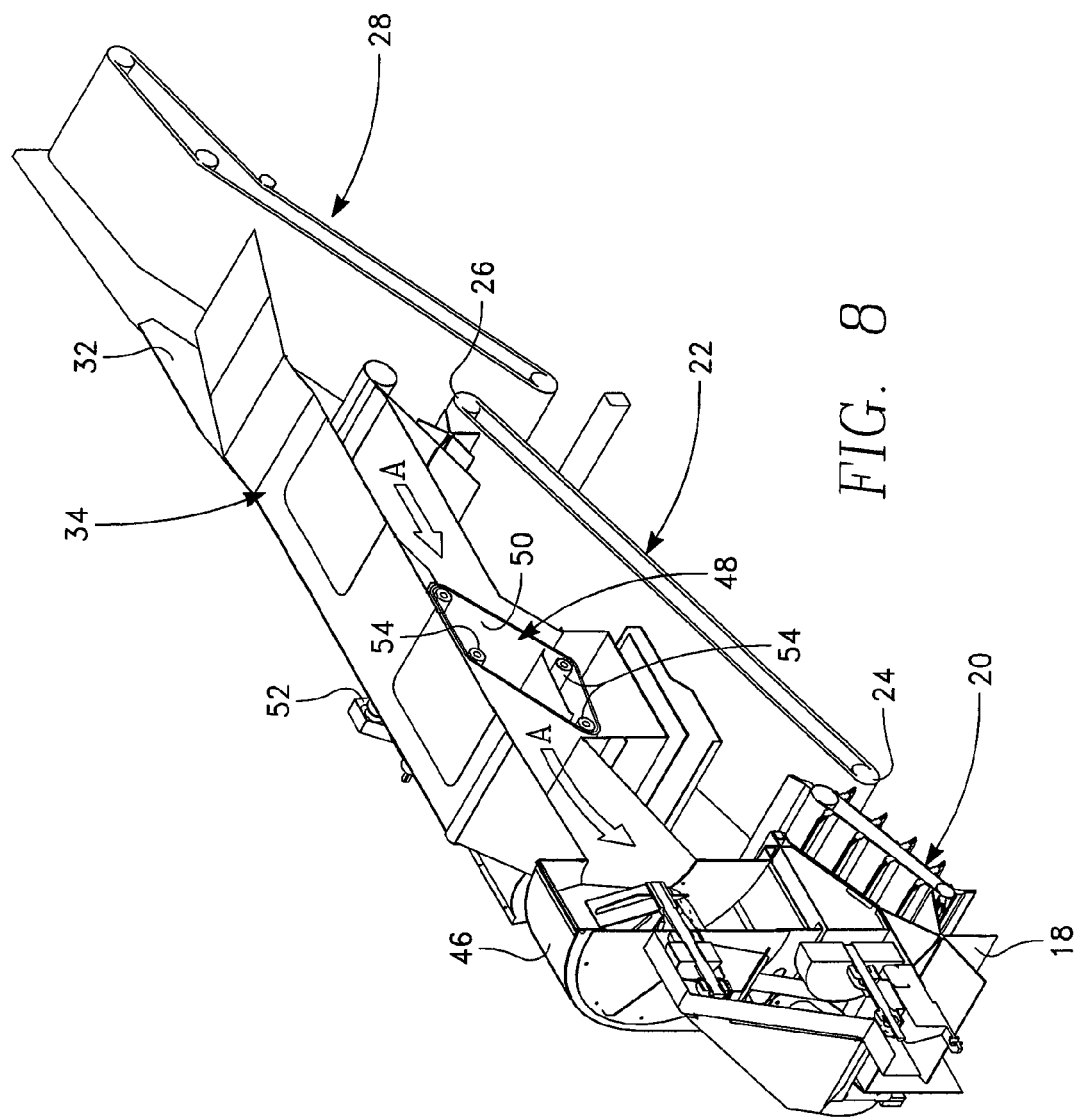
FIG. 8 is a sectional view of a harvester along line 8-8 of FIG. 6.
Figure 9:
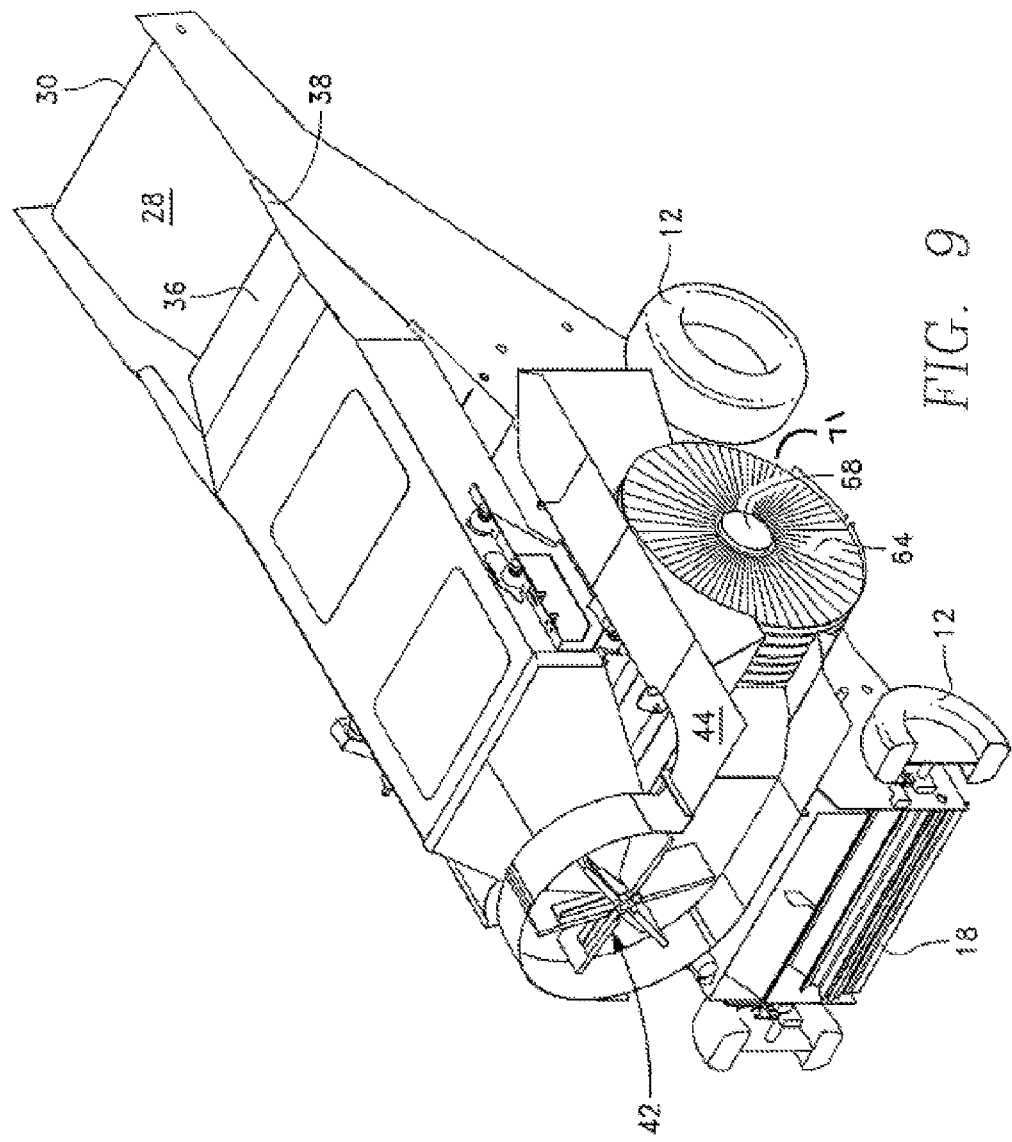
FIG. 9 is a sectional view of a harvester along line 9-9 of FIG. 6, with a portion of the housing removed to show the fan rotor and drum brush.
Figure 10:
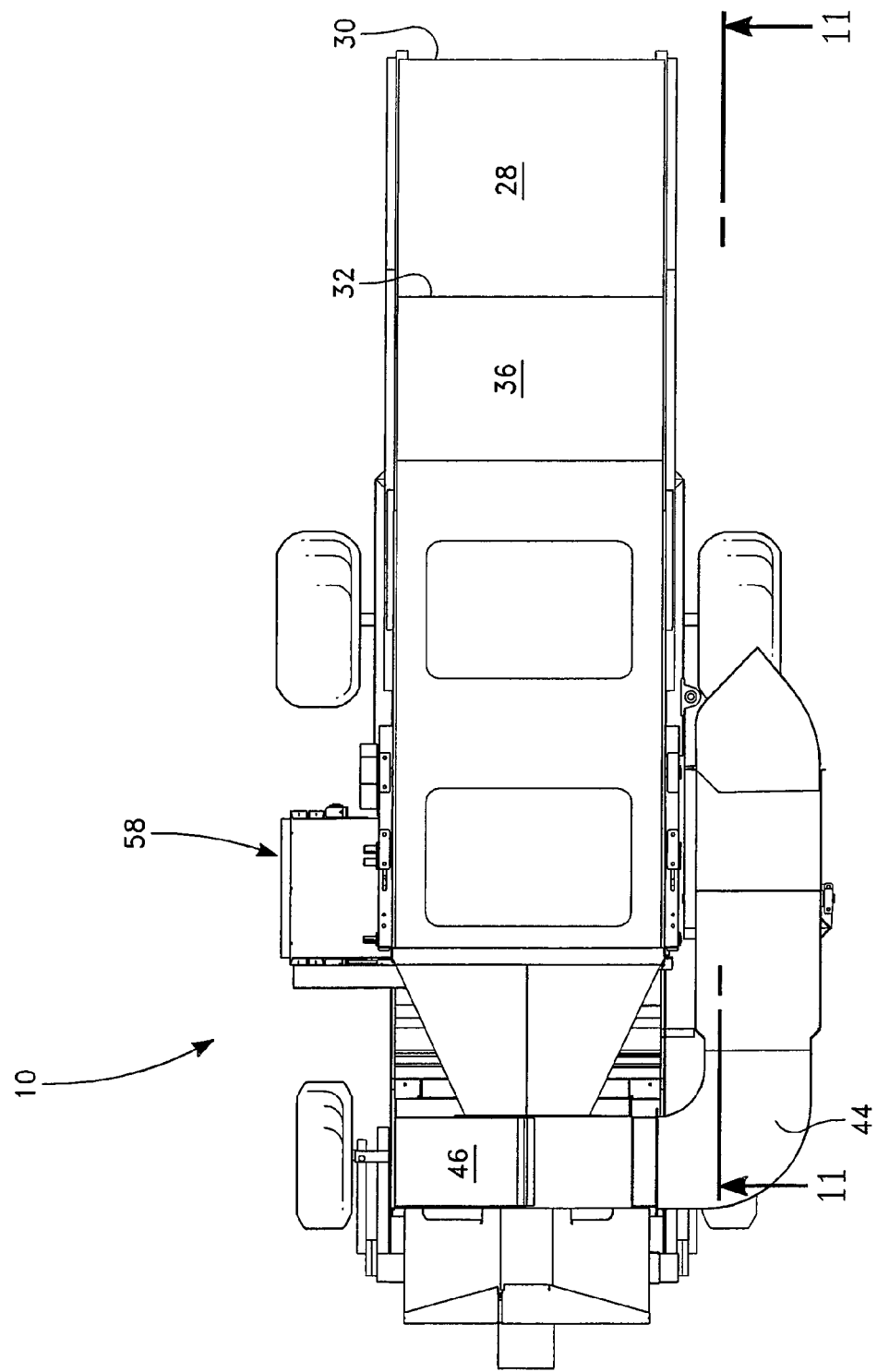
FIG. 10 is a top view of an embodiment of the harvester.
Figure 11:
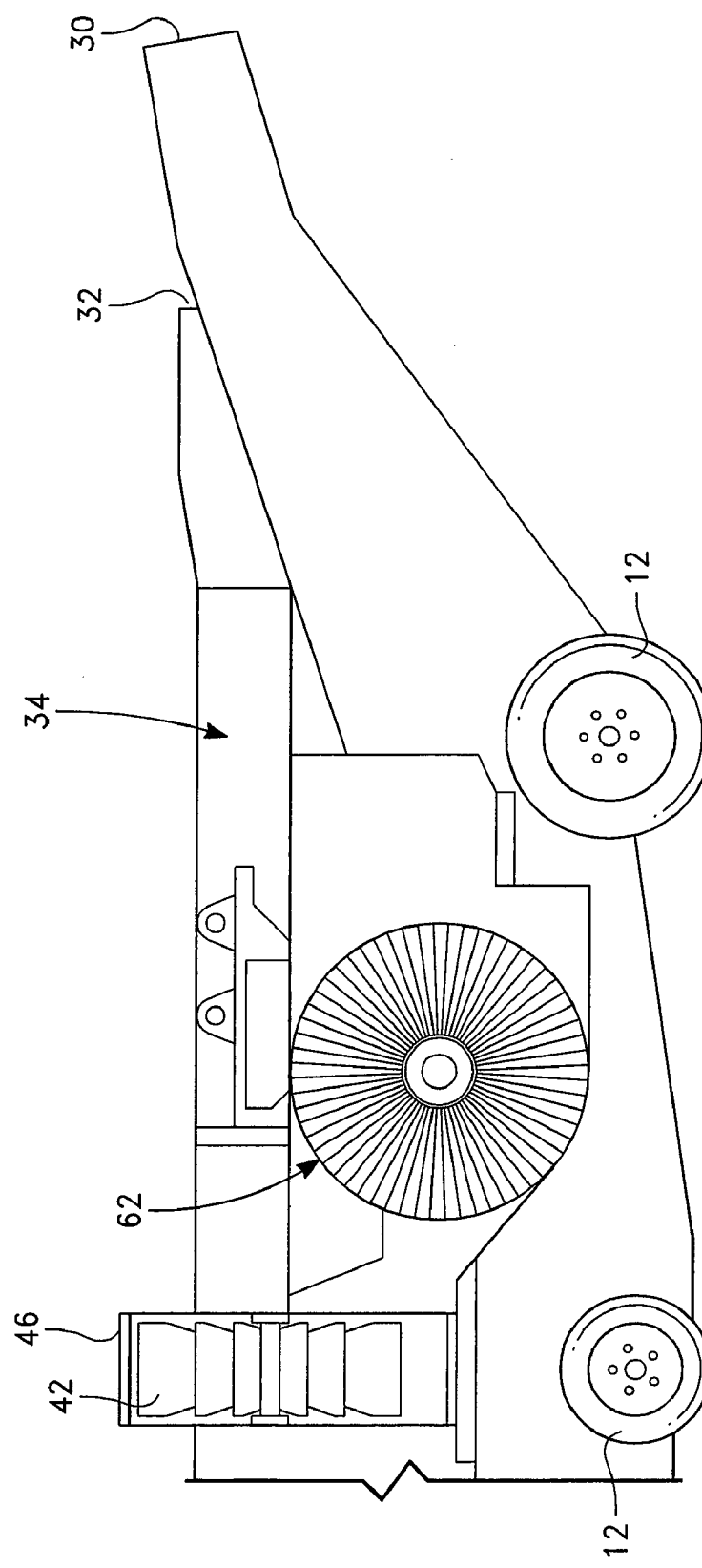
FIG. 11 is a sectional view taken along line 11-11 of FIG. 10.
Figure 12:
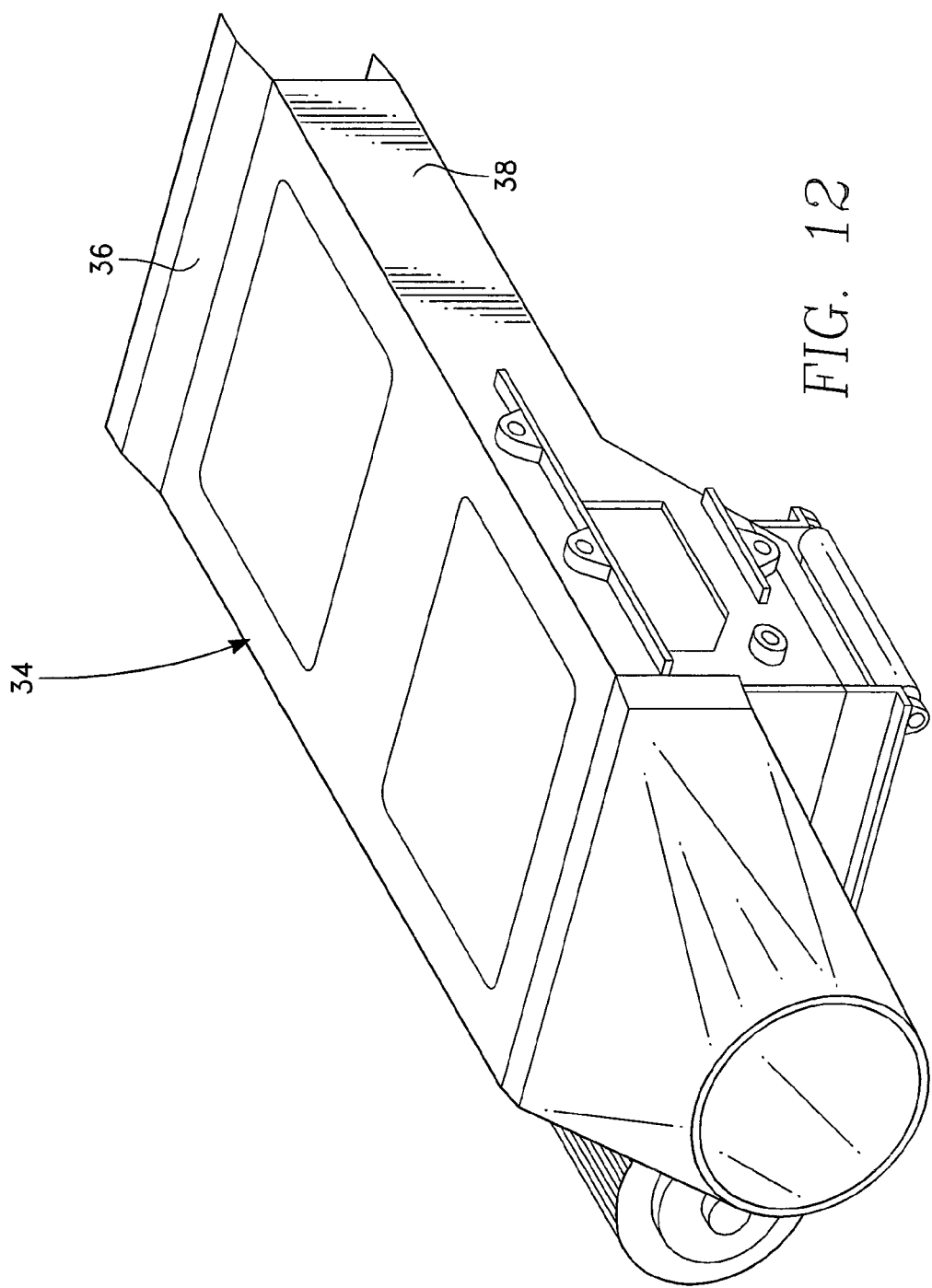
FIG. 12 is a partial isometric showing a portion of the upper housing for for an embodiment of the disclosed dust suppression system.
Figure 13:
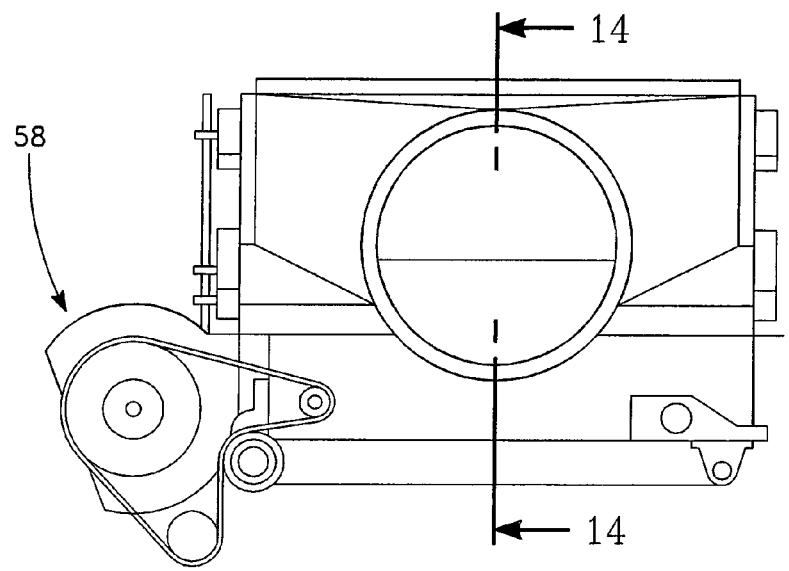
FIG. 13 shows a partial front view of the housing for an embodiment of the harvester.
Figure 14:
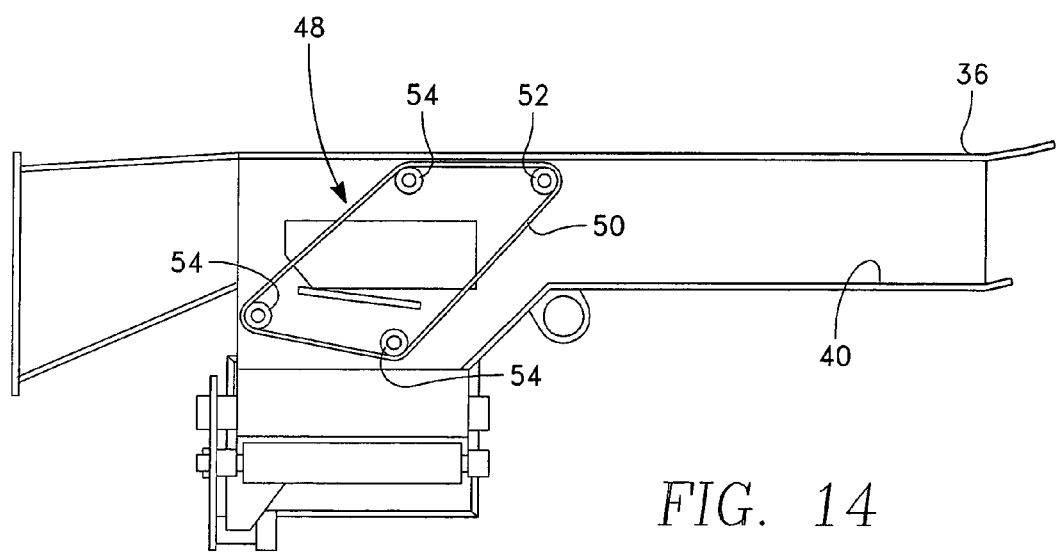
FIG. 14 is a sectional view taken along line 14-14 of FIG. 13.
Figure 15:
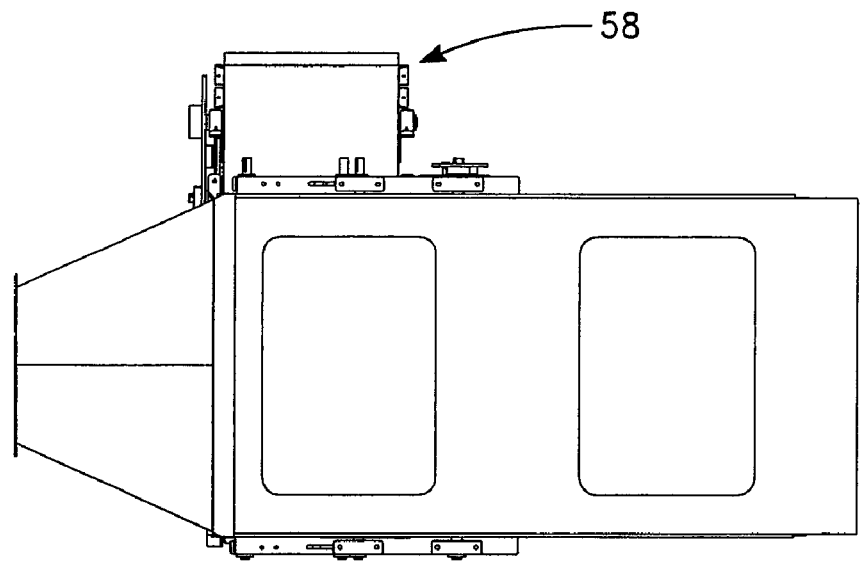
FIG. 15 is a partial top view of the housing for an embodiment of the harvester.
Figure 16:
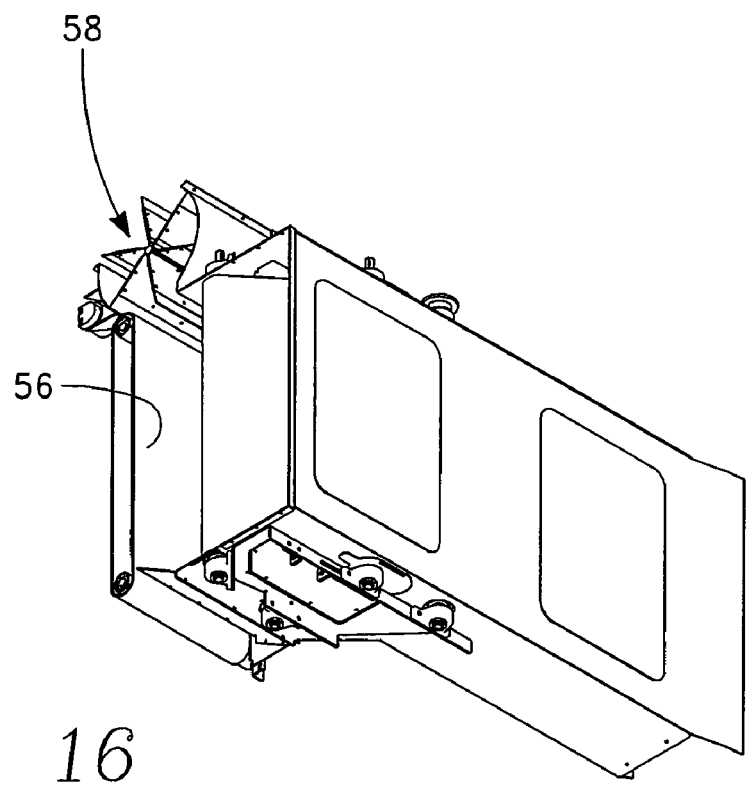
FIG. 16 is a partial isometric view of the housing for an embodiment of the harvester.
Figure 17:
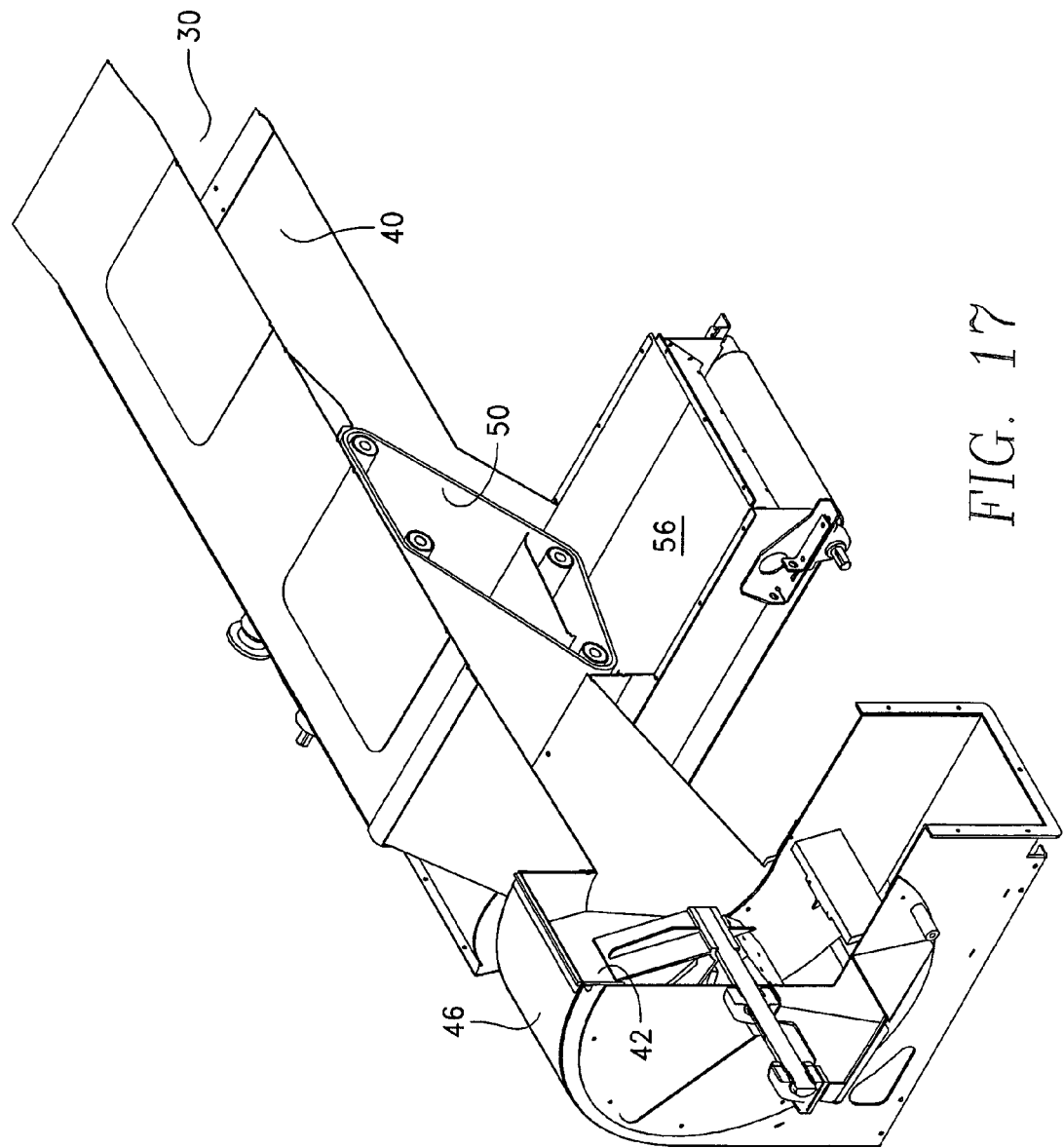
FIG. 17 is a partial sectional view showing, among other things, the relative positions of the air stream cleaning chain and the cross conveyor discharge belt which may be utilized in an embodiment of the disclosed harvester.
Figure 18:
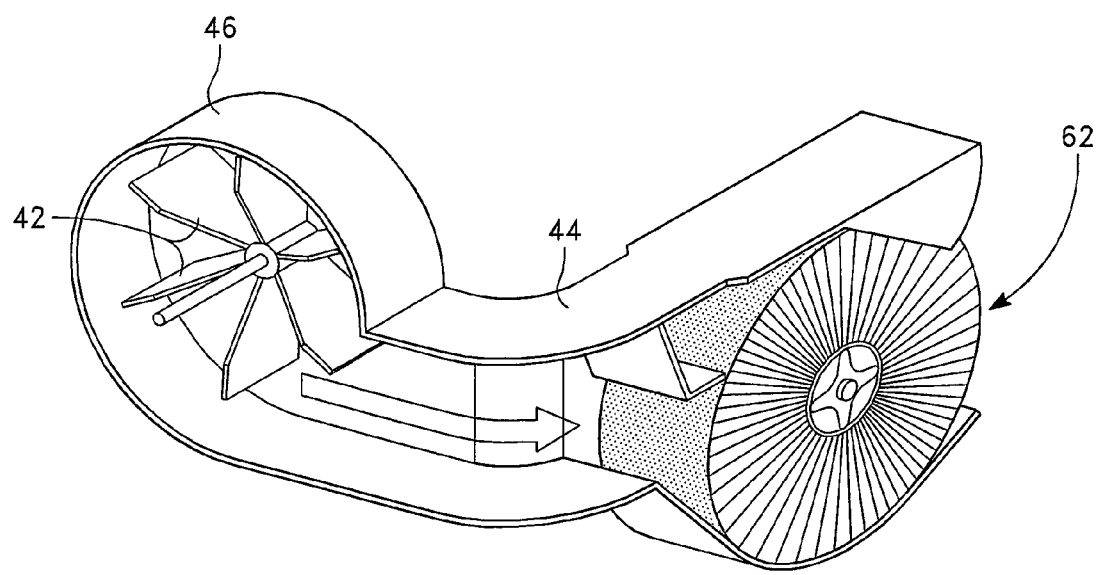
FIG. 18 shows a partial isometric view of a fan-brush combination which may be utilized in an embodiment of the disclosed harvester, showing the flow direction.
Figure 19:
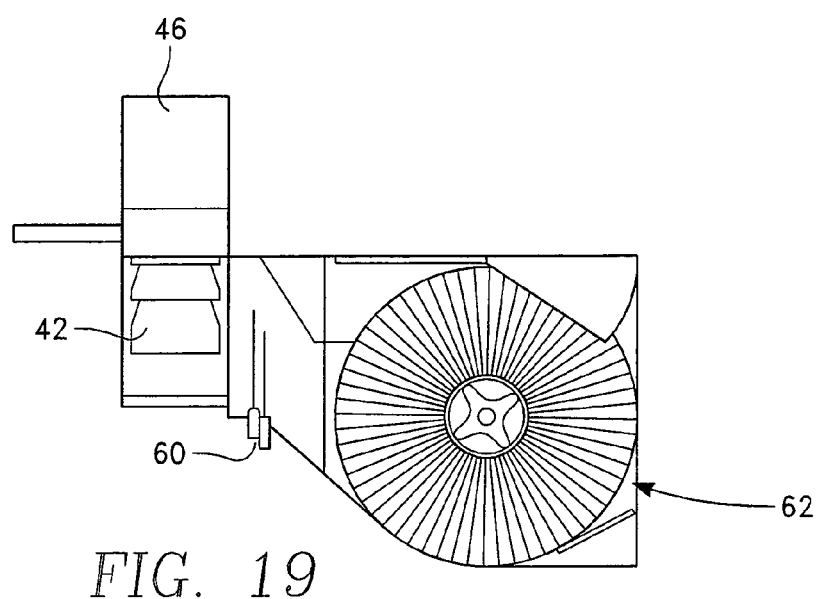
FIG. 19 shows a partial side view of the fan-brush combination shown in FIG. 18.
Figure 20:
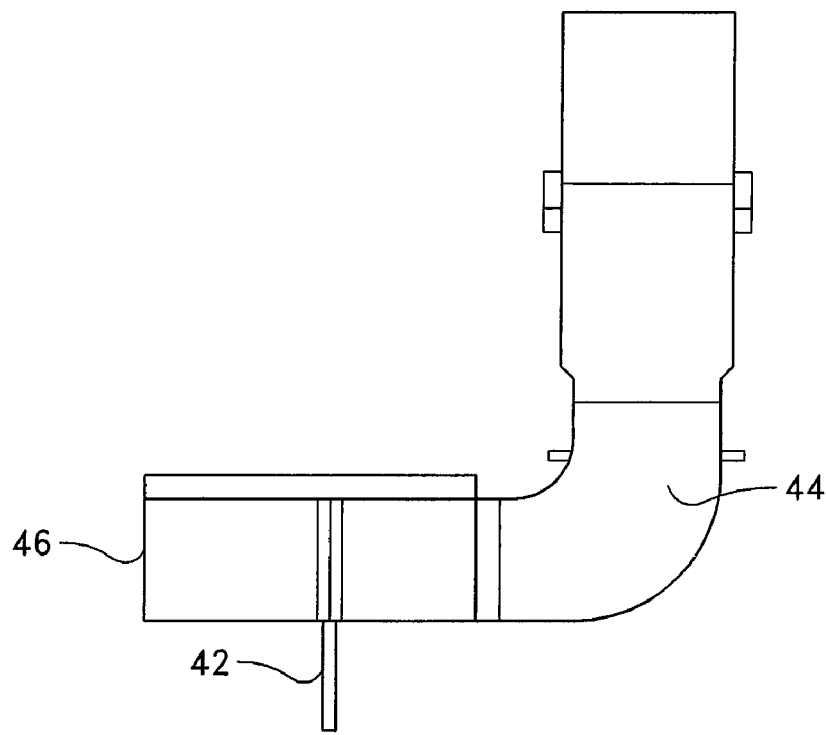
FIG. 20 shows a partial top view of the exterior of the housing for the fan-brush combination shown in FIG. 18.
Figure 21:
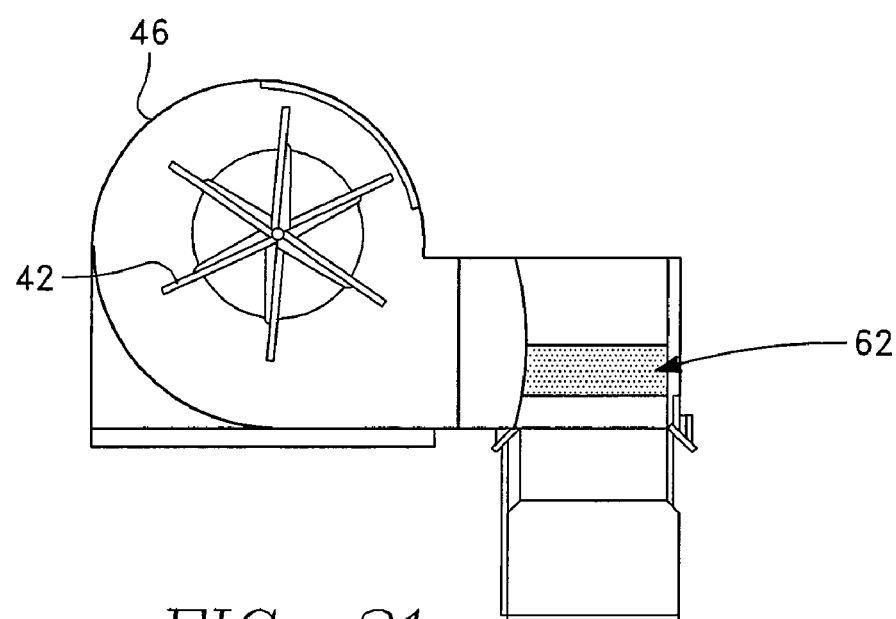
FIG. 21 shows a partial front view of the fan-brush combination shown in FIG. 18, showing an option for placement for liquid spray tips.
Figure 22:
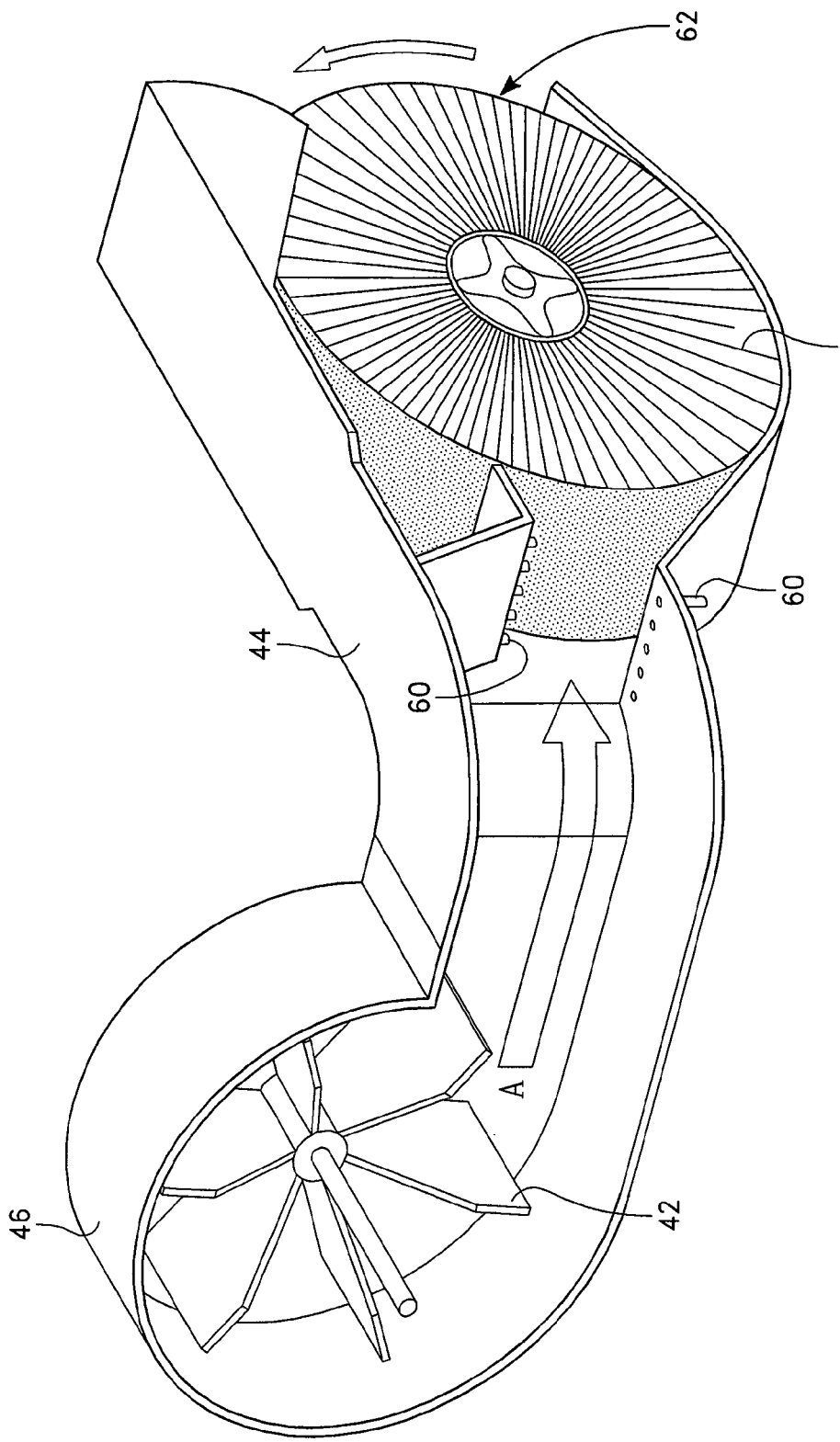
FIG. 22 shows a partial isometric view of a fan brush combination which may be utilized in an embodiment of the disclosed harvester.
Figure 23:
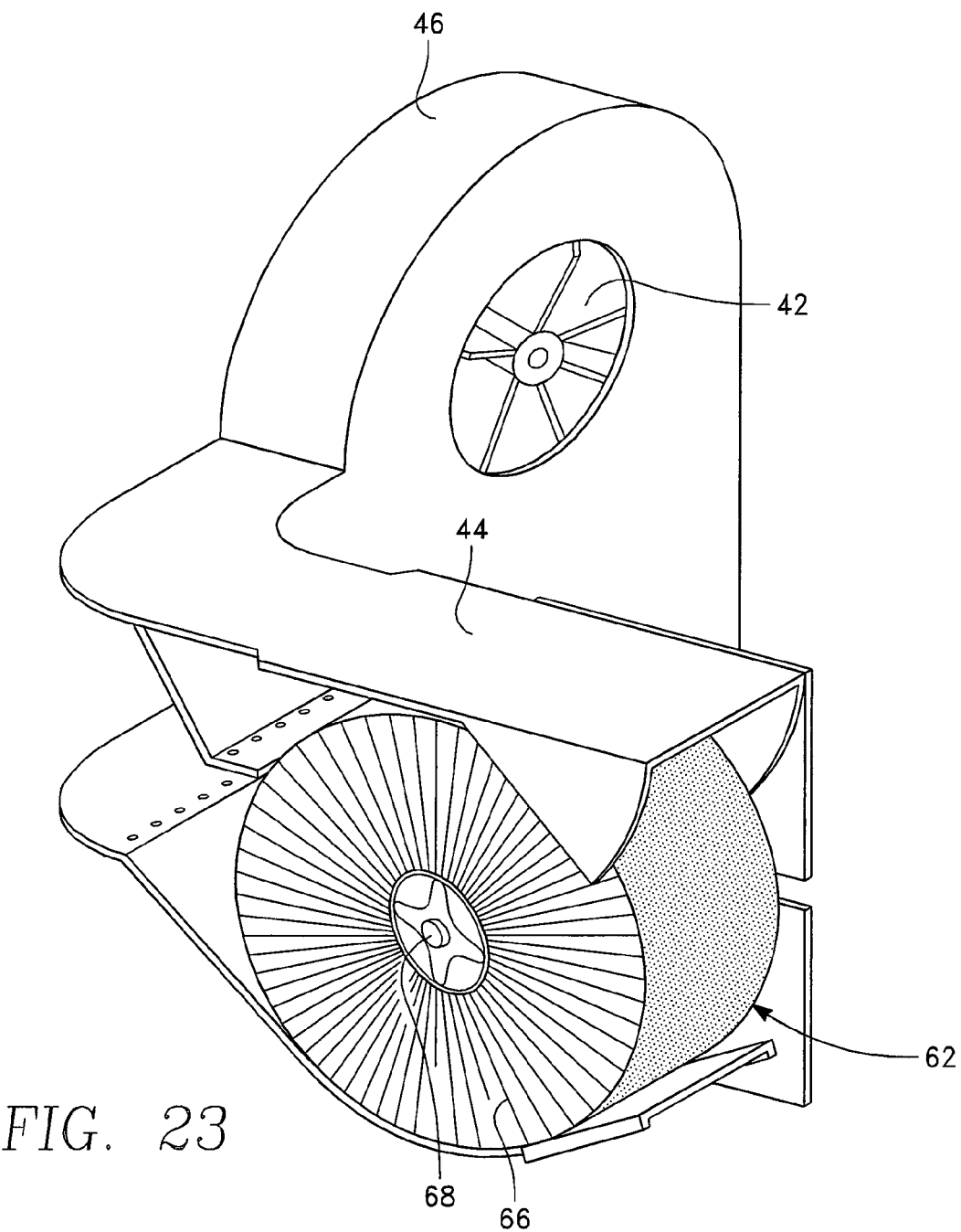
FIG. 23 shows another view of a fan brush combination which may be utilized in an embodiment of the disclosed harvester.
Figure 24:
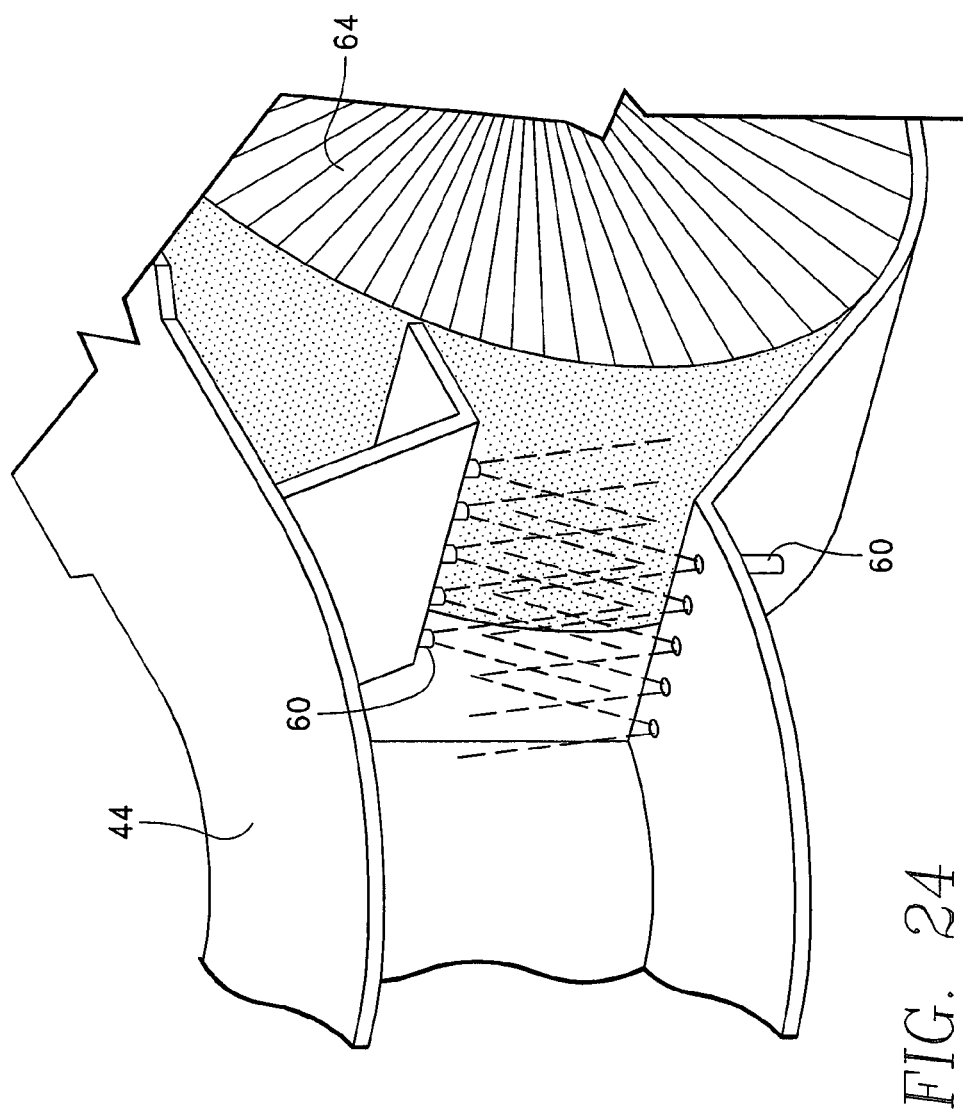
FIG. 24 shows a view of a liquid introduction means which might be utilized in an embodiment of the disclosed harvester.
Figure 25:
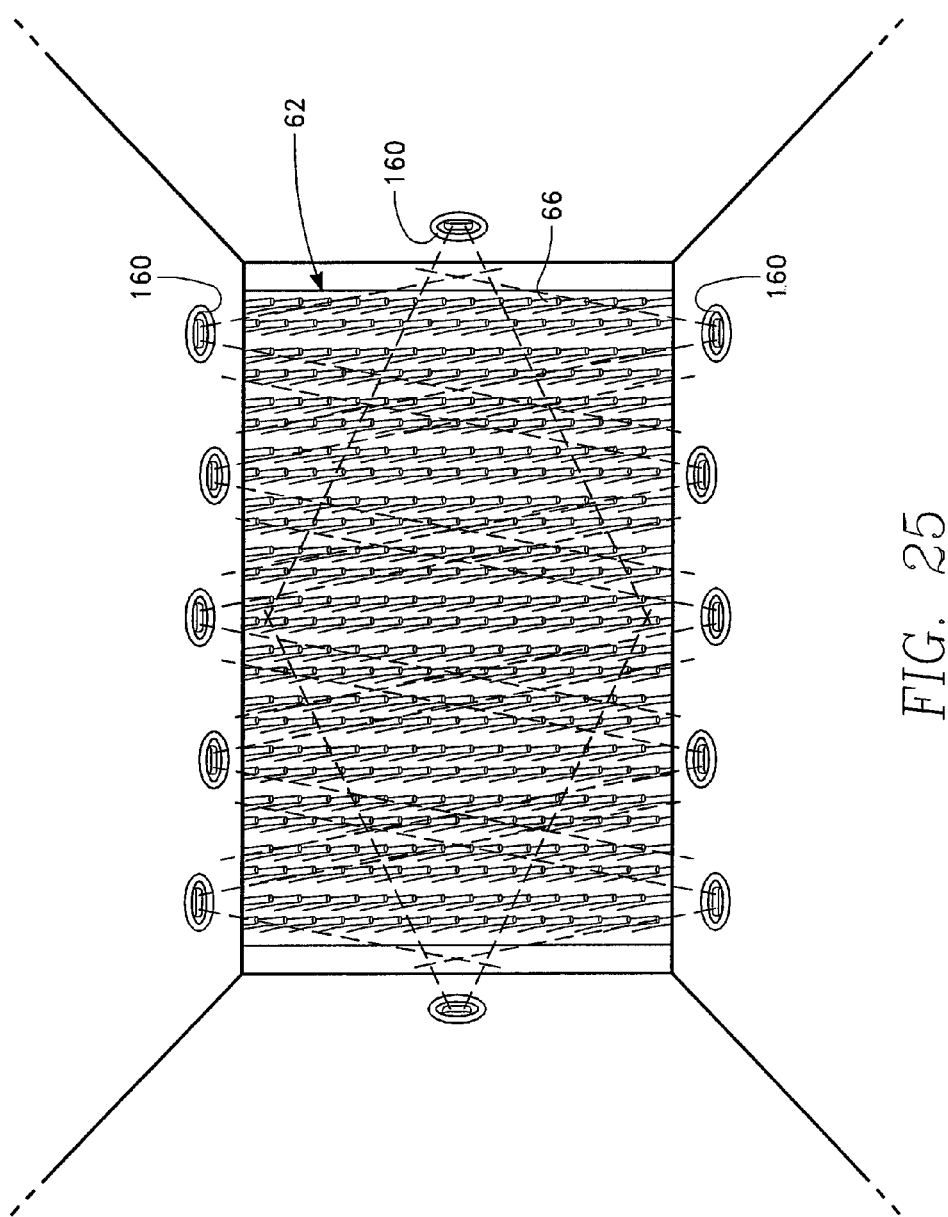
FIG. 25 shows a close up view of another liquid introduction means which might be utilized in an embodiment of the disclosed harvester.

Now with reference to the figures, FIG. 1 shows an embodiment of a harvesting unit 10 which may comprise the dust suppression system disclosed herein. This type of harvesting unit 10 is mobile, having ground conveyance means such as wheels 12, but it might also comprise tracks, rollers, etc. Harvesting unit 10 gathers harvested crops, such as nuts, fruits and the like, from the ground surface, where the crops will typically have been deposited from the shaking of trees or other harvesting method. The crops are typically deposited in a spread out configuration, forming a carpet on the ground surface. This type of harvesting unit 10 is well suited for the processing of almonds, but could also be utilized in the gathering of a variety of other crops lying on a ground surface after having been removed from a tree. In addition to almonds, the harvested crop may be another variety of nut, such as cashews, chestnuts, hazelnuts, macadamia nuts, pecans, walnuts and tung nuts. Certain fruits, such as figs and oranges, and any fruit, nut or vegetable, as conventionally known to require collection and processing from the ground, may also be gather with this type of harvester, and the present dust suppression system employed. It is to be appreciated that while the Figures herein show a harvester 10 which is equipped to be towed by a tractor or other towing vehicle, the present dust suppression system may equally be utilized with a self-propelled harvesting unit. The various conveyors, chains, drive wheels, etc. of the harvester will be driven by the means known in the art, typically by hydraulic motors.

The type of harvesting unit 10 which may comprise the dust suppression system disclosed herein generally comprises a collection means for collecting the agricultural products, such as crops 14, from the ground surface S. Because the crops 14 are blanketed across the ground dispersed among other foreign matter 16, such as leaves, twigs, dirt, gravel, dirt clods, etc., the collection means will gather a combination of all of these materials into the harvesting unit. The foreign matter 16 will typically comprise a mixture of larger and smaller particles, and some foreign matter will comprise dirt or other relatively fine grained particles. The collection means may comprise brushes, conveyors, or a sweeping array as disclosed in U.S. Pat. Nos. 7,131,254 and 7,412,817 which were invented by some of the inventors herein and which are incorporated herein in their entireties by this reference. One embodiment of the collection means may comprise a rotating sweeper 18 and/or pickup belt 20 which gather the agricultural products and foreign matter from the ground S. The collection means directs all of the gathered materials onto a primary chain 22. The primary chain 22 has a receiving end 24 which receives the crops and foreign matter which have been collected by the collection means. At the end opposite the receiving end 24, the primary chain comprises a delivery end 26 to which substantially all of the crops and foreign matter are delivered. However, it is to be appreciated that the primary chain 22, and the other chains of most harvesters, are typically linked chain with openings, such that smaller foreign matter and perhaps smaller crops will fall through back onto the ground surface S. Therefore, while a substantial amount of the crops and foreign matter will reach the receiving end 24, some of the crops and foreign matter may have fallen through the openings in the primary chain 22.

The harvesting unit 10 further comprises an elevator chain 28. The elevator chain 28 receives crops and foreign matter from primary chain 22. The crops are carried up elevator chain 28 and discharged through discharge chute 30 to a storage container, the ground, or other repository for the crops. Adjacent to elevator chain 28 is the end 32 of a ductwork or housing 34 which may be oriented along the lengthwise axis of the harvesting unit 10. An opening is defined at the end 32 of the housing by the top 36, side pieces 38, and bottom 40. A fan 42 is disposed within housing 34 within its own fan housing 46. Fan 42 generates an air stream A by pulling air from the opening at the end 32 of the housing 34 and discharging the air into discharge duct 44 on the opposite site of the fan 42. The air stream A flows through housing 34, with the direction of the air stream generally moving from the elevator chain 28 toward the fan 42. The fan 42 may thus be considered to have a suction side which is oriented toward end 32 and at least a portion of elevator chain 28 and a discharge side which begins on the opposite side of the fan, with the generated air stream discharging into air stream discharge duct 44. As suction is pulled by the air stream A through the openings in elevator chain 28, and through the crops and foreign matter being transported on the elevator chain, the lighter foreign matter is carried in the air stream toward fan 42 through housing 34.

Disposed between fan 42 and elevator chain 28 is an air stream cleaning chain assembly 48. The air stream cleaning chain assembly 48 comprises the primary separation methodology for removing foreign material from the air stream before much of the foreign material is passed through the fan 42 and discharged into the atmosphere. The air stream cleaning chain assembly 48 may comprise air stream cleaning chain 50, drive roller 52 and idler rollers 54. As air stream cleaning chain 50 is rotated about the idler rollers 54, a portion of the air stream cleaning chain is continually positioned to be normal to the general direction of the air stream A. Air stream cleaning chain 50 allows the air stream to pass through it, but stops the larger particles of foreign material, such as leaves, grass, etc., because the air stream cleaning chain comprises a plurality of closely spaced links, wherein the openings between the links are relatively small. Air stream cleaning chain 50 may have a width of approximately four feet in width.

Foreign material which is stopped by the air stream cleaning chain 50 is discharged from the harvesting unit 10 by discharging means which transport the larger particles of the foreign matter collected on the air stream cleaning chain to the exterior of the harvesting unit. The discharging means may comprise a cross conveyor discharge belt 56 which is disposed below the air stream cleaning chain 50. Foreign material accumulated on the air stream cleaning chain is deposited onto the cross conveyor discharge belt 56, which transports the larger particles of the foreign material to a disposal duct through an air lock assembly 58.

The finer particles of foreign material will be carried through the openings in air stream cleaning chain 50 and transported through housing 34 by air stream A through fan 42 and into air stream discharge duct 44, which is on the discharge side of the fan. The air stream discharge duct 44 comprises a further mechanism for removing particulates from the air exhaust of the harvester 10, which is utilized to remove smaller particles which passed through the air stream cleaning chain 50. This mechanism employs injecting water or other appropriate liquid into the air stream A as it enters the air stream discharge duct 44. As shown in FIGS. 18 through 25, the air stream discharge duct 44 comprises liquid introduction means such as a plurality of spray tips 60, or other liquid introduction means, such as directional jets 160 shown on FIG. 25. Directional jets 160 may be set within the inside wall of air stream discharge duct 44 and may be installed and directed to provide a curtain of liquid spray through which the air stream A, with its entrained dust particles, passes. Other liquid introduction means may be utilized. For example, spray tips comprising a variety in number and tip size may be used for this purpose. As another embodiment, the system may utilize multiple manifolds of spray tips to offer various options for the introduction of the liquid into the dust infused air stream. The harvester 10 may comprise liquid storage tanks for storing the liquid utilized for the liquid sprayed into the air stream discharge duct 44, and the related pumps and conduits required for the liquid injection process. Alternatively, the storage tanks and pumps may be carried on a separate apparatus.

The air stream discharge duct 44 may comprise additional means for suppressing the fine dust particles transported in the air stream A. The air stream discharge duct may further comprise a dust scrubber assembly 62. Dust scrubber assembly 62 may comprise a rotating wafer brush drum 64. The wafer brush drum consists of multiple wafer brushes 66 mounted on a brush attachment sleeve 68, or other collection members which radially extend from the brush attachment sleeve. The wafer brush drum 64 may be rotated in a concurrent direction with the flow of air stream A so as not to cause undue back pressure on the air system. Because of the liquid introduction means discussed above, the air stream A reaching the wafer brush drum is moistened. As the moistened air stream A flows through the wafer brushes, small pieces of moist dirt are scrubbed from the air stream, accumulating on the collection members such that the air being discharged through air exhaust 70 has been substantially cleaned of particulate matter. Aggregated solids may be discharged from the apparatus through solids discharge chute 71.

Air stream discharge duct 44 connects to fan housing 46 at flange 72. Portions of air stream discharge duct 44 may be easily removable to gain access to the various components of the dust scrubber assembly 62 and the liquid introduction means contained therein. For example, flange 72 may be held together with a quick-release mechanism 74 and air stream discharge duct 44 may be hinge connected at the flange to allow the air stream discharge duct to pivot outwardly so there is easy access to the internal components.

While the above is a description of various embodiments of the present invention, further modifications may be employed without departing from the spirit and scope of the present invention. Thus the scope of the invention should not be limited according to these factors, but according to the following appended claims.

What is claimed is:

1. In a mobile apparatus for gathering agricultural products disposed on a ground surface, the apparatus comprises:
a collection means for collecting the agricultural products and foreign matter from the ground, the foreign matter comprising a mixture of larger and smaller particles;
a primary chain having a receiving end and a delivery end, wherein the receiving end receives the agricultural products and foreign matter from the collection means, and the delivery end comprises the opposing end of the primary chain to which a substantial amount of the agricultural products and foreign matter are carried by the primary chain;

an elevator chain which receives the agricultural products and foreign matter from the delivery end of the primary chain and transports substantially all of the received agricultural products to a discharge chute;

a fan having a suction side and a discharge side, the fan generating an air stream, wherein the air stream is pulled through the elevator chain and through the agricultural products and the foreign matter carried on the elevator chain, wherein at least a portion of the foreign matter is transported by the air stream from the elevator chain toward the suction side of the fan;

an air stream cleaning chain disposed between the elevator chain and the suction side of the fan, wherein the air stream cleaning chain comprises a plurality of openings, the openings sized to allow the air stream to pass through the air stream cleaning chain while collecting the larger particles of the foreign matter transported by the air stream on the air stream cleaning chain as the air stream passes through;

an air stream discharge duct comprising a dust particle suppression means disposed on the discharge side of the fan wherein the dust particle suppression means comprises a liquid introduction means which injects liquid droplets into the air stream; and an air stream exit through which the air stream exits the apparatus.

2. The mobile apparatus of claim 1 wherein the liquid introduction means is disposed within the air stream discharge duct.

3. The mobile apparatus of claim 2 wherein the liquid introduction means comprises a plurality of spray tips mounted within the air stream discharge duct.

4. The mobile apparatus of claim 2 wherein the dust particle suppression means further comprises a plurality of dust accumulation members between the liquid introduction means and the air stream exit.

5. The mobile apparatus of claim 4 wherein the dust accumulation members comprise a plurality of brushes radially extending from a rotatable attachment sleeve, the brushes accumulating moistened dust particles from the air stream, forming aggregated solids.

6. The mobile apparatus of claim 5 wherein the rotatable attachment sleeve is configured to rotate in the same direction as the flow of the air stream.

7. The mobile apparatus of claim 1 further comprising discharging means for transporting the larger particles of the foreign matter collected on the air stream cleaning chain from the apparatus.

8. The mobile apparatus of claim 7 wherein the discharging means comprises a cross conveyor discharge belt which receives the larger particles of foreign matter from the air stream cleaning chain.

9. The mobile apparatus of claim 7 wherein the cross conveyor discharge belt discharges the larger particles of foreign matter from the mobile apparatus through a disposal duct having an air lock.

10. In a mobile apparatus for gathering agricultural products disposed on a ground surface, the apparatus comprises:

a collection means for collecting the agricultural products and foreign matter from the ground, the foreign matter comprising a mixture of larger and smaller particles;

a primary chain having a receiving end and a delivery end, wherein the receiving end receives the agricultural products and foreign matter from the collection means, and the delivery end comprises the opposing end of the primary chain to which a substantial amount of the agricultural products and foreign matter are carried by the primary chain;

an elevator chain which receives the agricultural products and foreign matter from the delivery end of the primary chain and transports substantially all of the received agricultural products to a discharge chute;

a fan having a suction side and a discharge side, the fan generating an air stream, wherein the air stream is pulled through the elevator chain and through the agricultural products and the foreign matter carried on the elevator chain, wherein at least a portion of the foreign matter is transported by the air stream toward the suction side of the fan;

an air stream cleaning chain disposed between the elevator chain and the suction side of the fan, wherein the air stream cleaning chain comprises a plurality of openings, the openings sized to allow the air stream to pass through the air stream cleaning chain while collecting the larger particles of the foreign matter on the air stream cleaning chain as the air stream passes through; and an air stream discharge duct through which the air stream exits the apparatus wherein the air stream discharge duct comprises a liquid introduction means which injects liquid droplets into the air stream.

11. The mobile apparatus of claim 10 further comprising discharging means for transporting the larger particles of the foreign matter collected on the air stream cleaning chain from the apparatus.

12. The mobile apparatus of claim 10 wherein the discharging means comprises a cross conveyor discharge belt which receives the larger particles of foreign matter from the air stream cleaning chain.

13. The mobile apparatus of claim 12 wherein the cross conveyor discharge belt discharges the larger particles of foreign matter from the apparatus through a disposal duct having an air lock.

14. The mobile apparatus of claim 10 further comprising an air stream exit through which the air stream exits the apparatus.

15. The mobile apparatus of claim 10 wherein the liquid introduction means comprises a plurality of spray tips mounted within the air stream discharge duct.

16. The mobile apparatus of claim 10 further comprising a plurality of brushes radially extending from a rotatable attachment sleeve, the brushes accumulating moistened dust particles from the air stream to form aggregated solids.

17. The mobile apparatus of claim 16 wherein the rotatable attachment sleeve is configured to rotate in the same direction as the flow of the air stream.

* * * * *